H. A. JOHNSON.
SHAFT COUPLING.
APPLICATION FILED APR. 3, 1919.
1,345,446.
Patented July 6, 1920.
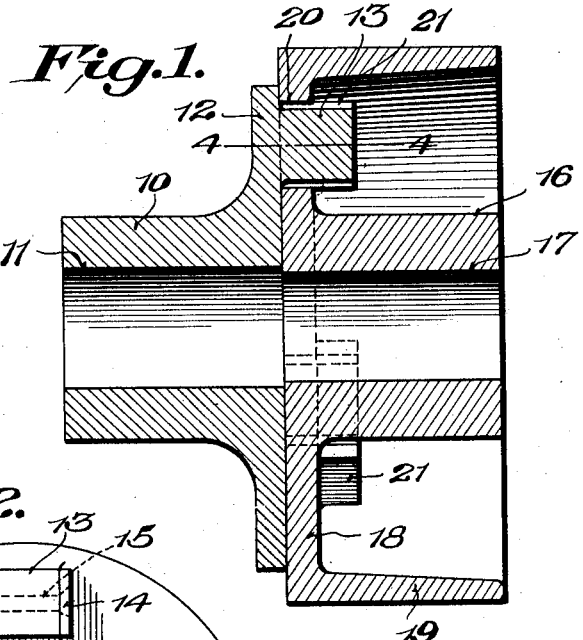
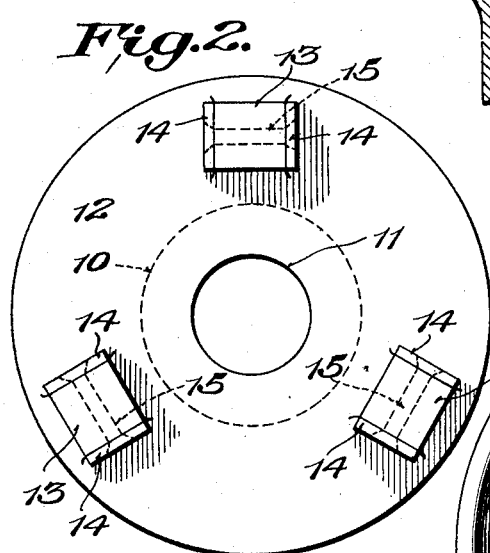
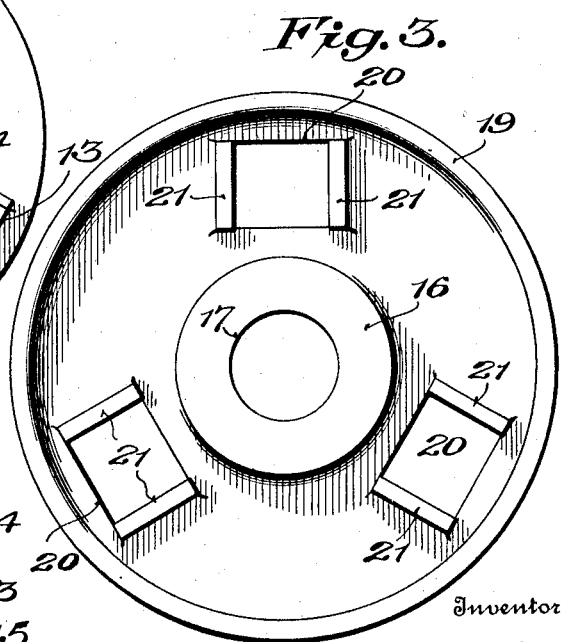
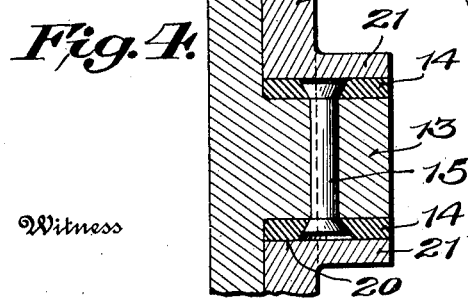
Inventor
Howard A. Johnson,
By Foster, Freeman, Watson & Coix,
Attorney
Witness
Chas. L. Griestauer

UNITED STATES PATENT OFFICE.

HOWARD A. JOHNSON, OF NORFOLK, VIRGINIA.

SHAFT-COUPLING.

1,345,446.   Specification of Letters Patent.   Patented July 6, 1920.

Application filed April 3, 1919. Serial No. 287,275.

*To all whom it may concern:*

Be it known that I, HOWARD A. JOHNSON, a citizen of the United States, and residing at Norfolk, Norfolk county, State of Virginia, have invented certain new and useful Improvements in Shaft-Couplings, of which the following is a specification.

The present invention relates to shaft couplings and more particularly to the type which permits the axes of the shafts to assume positions at slight angles to each other.

The objects of the invention are to provide a coupling of this type which shall consist of a minimum number of parts, each of simple form, and constructed so that the coupling may be assembled with very little labor. Other objects and features of novelty will be apparent from the description taken in connection with the drawings in which:

Figure 1 is a longitudinal sectional elevation through a coupling constructed in accordance with the present invention;

Fig. 2 is an end elevation of the left hand member shown in Fig. 1, as viewed from the right of said figure.

Fig. 3 is an end elevation of the right hand member shown in Fig. 1, as viewed from the right of said figure; and Fig. 4 is a sectional view of a detail taken substantially on the line 4—4 of Fig. 1.

Referring to the drawings, the coupling in the form shown, comprises two members adapted to be mounted on the adjacent ends of the shafts to be rotatively connected. One of the coupling members consists of a hub 10 formed with a bore 11 to receive one of the shafts. At one end the hub 10 has a radial flange 12 provided with projections 13 extending from the end face of said flange in an axial direction. In the form shown there are three of these projections 13 uniformly spaced angularly and the same distance radially from the axis of the bore 11. Preferably these projections are prismatic and have their radially disposed sides lagged. Thus as shown the said sides of the projections each has a layer 14 of lagging material, such as leather, secured thereto as by means of the rivet 15. The other member of the coupling comprises a hub 16 formed with a bore 17 for the other shaft. The end of the hub 16 facing the first described coupling member has a radially disposed web 18 at the periphery of which is an integral annular rim 19 spaced from and surrounding the said hub 16. The web 18 is formed with a plurality of apertures 20 extending therethrough of such size and so positioned as to receive the projections 13 on the other coupling member. In order to increase the area of the web 18 bearing against these projections, the radially disposed sides of the apertures have the wings 21, the inner surfaces of which are flush with the radial edges of the apertures 20. If desired, the periphery of the rim 19 may be used as a brake surface. It is to be understood that the coupling members are secured to their respective shafts in any suitable manner.

The lagging on the sides of the projections 13 constitutes a cushion rendering the coupling flexible and also acts to deaden the noise resulting when the projections 13 strike the sides of the apertures 20 and thus a substantially noiselessly operating coupling is provided. Furthermore, the coupling consists of two members only, there being no bolts or other connections required.

It is to be understood that the invention is not limited to the exact form and proportions illustrated, but includes modifications and changes which come within the scope of the appended claims.

Having thus described the invention what is claimed as new and desired to be secured by Letters Patent is:

1. As an article of manufacture, a coupling member comprising a hub having a radial flange at one end thereof, said flange formed with a circular series of apertures extending therethrough, and bearing wings at the sides of said apertures, the inner surfaces of said wings being flush with the sides bounding said apertures.

2. As an article of manufacture, a coupling member comprising a hub having a radial flange at one end thereof, and an annular rim secured to said flange surrounding and spaced from said hub, the portion of the flange between the hub and rim having apertures extending therethrough and bearing wings at the radially disposed side portions of said apertures, the inner surfaces of said wings being flush with the side edges bounding said apertures.

3. A coupling comprising in combination, a hub having a radial flange at one end thereof, said hub formed with a bore and said flange having projections extending in an axial direction from its end face; a second hub having a bore and a radial web at one end thereof, an annular rim secured to said web surrounding and spaced from said second hub, said web formed with apertures to receive the said projections, and bearing wings at the radially disposed side portions of said apertures, the corresponding side portions of said projections being lagged.

In testimony whereof I affix my signature.

HOWARD A. JOHNSON